(No Model.)

W. BAGULEY.
PIPE STOPPER.

No. 443,952. Patented Dec. 30, 1890.

WITNESSES:

INVENTOR: W. Baguley

BY

ATTORNEYS

UNITED STATES PATENT OFFICE.

WILLIAM BAGULEY, OF NEW YORK, N. Y.

PIPE-STOPPER.

SPECIFICATION forming part of Letters Patent No. 443,952, dated December 30, 1890.

Application filed June 13, 1890. Serial No. 355,371. (No model.)

*To all whom it may concern:*

Be it known that I, WILLIAM BAGULEY, of New York, in the county and State of New York, have invented a new and Improved Pipe-Stopper, of which the following is a full, clear, and exact description.

My invention relates to certain improvements in pipe-stoppers specially designed for closing the ends of waste-pipes when the test is applied to discover flaws and other imperfections which would permit of the escape of sewer and other gases when in use; and the invention has for its object to provide a simple, efficient, and inexpensive stopper of this character.

The invention consists in the construction and combination of parts, as will be hereinafter fully described and claimed.

Reference is to be had to the accompanying drawings, forming a part of this specification, in which similar letters of reference indicate corresponding parts in all the figures.

Figure 1:
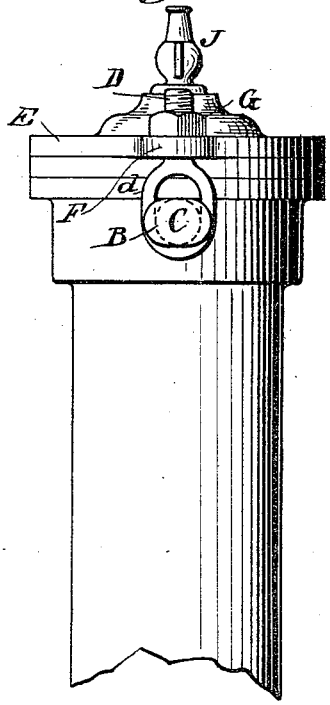
Figure 2:
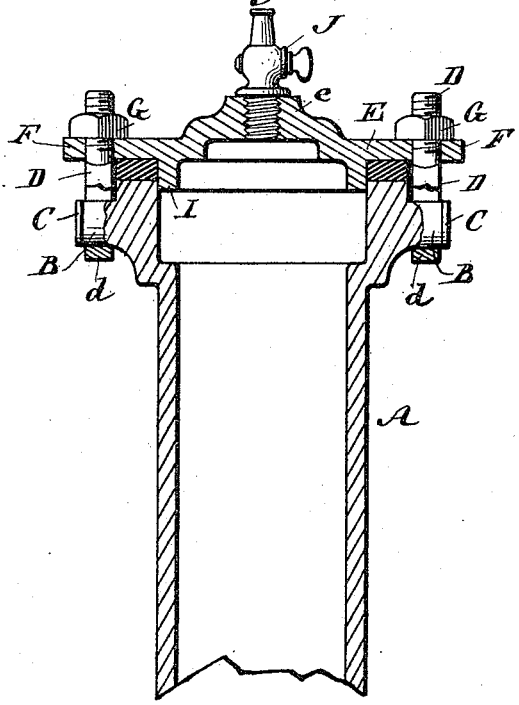
Figure 3:
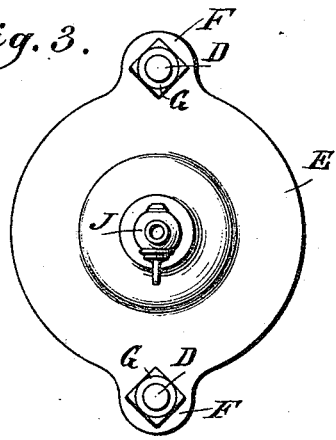
Figure 4:
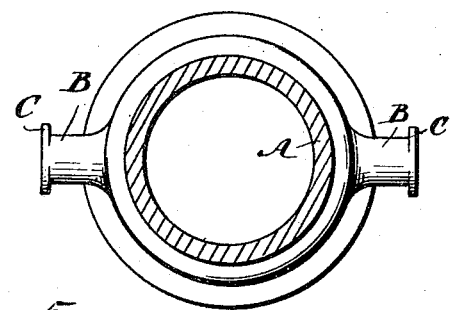
Figure 5:
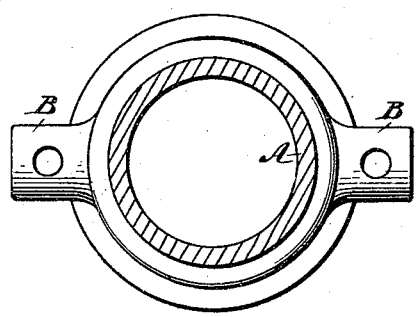

Figure 1 is an elevation of a section of pipe with my improved stopper applied. Fig. 2 is a vertical section of the same. Fig. 3 is a plan view of the same. Fig. 4 is an inverted plan view showing the projections on the pipe, and Fig. 5 is a like view showing the projections perforated for the passage of bolts.

A represents a section of waste-pipe provided with the usual swell and flange at the end.

On the swell, located centrally of the width of the same and on opposite sides of the pipe, are projections B, which may be cast with the pipe or secured thereto in any suitable manner. The projections B are round in form and have a head C, that is oblong in shape, with the major diameter horizontal.

D are binding-bolts adapted to engage with and lock on the projections B, provided with oblong heads $d$, having similar openings which correspond with the shape of heads C on the projections B, so that when the said bolts are held horizontally the head C will pass through the opening in the head of the bolts D. When the bolts D are passed over the heads C and turned to a vertical position, the major diameter of the opening in the head is at right angles to the major diameter of the oblong heads C on the projections B, thus securing the bolt against displacement. If desired, the projections B may be perforated, as shown in Fig. 5, and the bolts pass up through said perforations with the head of the bolt in contact with the projections B.

E is the head-plate, provided with lugs F, which align with the projections B when in place on the pipe-opening. The said lugs are perforated for the passage of the binding-bolts D. When the head-plate E is placed on the pipe A with a suitable washer interposed, the bolts D pass through the perforated lugs F and receive the nuts G, which are screwed down, making a tight joint, with the strain evenly distributed.

I is an annular flange on the head-plate E, corresponding to the internal diameter of the end of the pipe A, and into which it fits to prevent the washer from spreading inward on the flange of the pipe under the pressure of the head-plate. The central swell $e$ on the head-plate has a passage which opens to the interior of the pipe, and to which is connected a cock J for the admission of the testing-fluid.

Having thus described my invention, I claim as new and desire to secure by Letters Patent—

A pipe-stopper consisting of projections on the pipe, having oblong heads, connecting-bolts having openings in their heads to correspond with the heads of said projections, and a head-plate adapted to engage with the connecting-bolts, substantially as shown and described.

WILLIAM BAGULEY.

Witnesses:
   B. F. HOLSKE,
   C. SEDGWICK.